United States Patent Office 3,297,599
Patented Jan. 10, 1967

3,297,599
FRICTION COMPOSITION FOR HIGH
ENERGY SERVICE
Franklin W. Eschen, Martinsville, N.J., assignor to Johns-Manville Corporation, New York, N.Y., a corporation of New York
No Drawing. Filed May 24, 1965, Ser. No. 458,394
13 Claims. (Cl. 260—3)

This application is a continuation-in-part of Serial No. 246,310, filed December 21, 1962, for Friction Composition for High Energy Service.

This invention relates to improved friction compositions for the manufacture of friction elements for braking mechanisms, and in particular the invention is directed to friction compositions and/or elements formed therefrom for high energy service.

Typical friction compositions or products comprising the same, although effective and adequate under ordinary service conditions as in normal usage in motor cars, trucks, and buses, more often that not exhibit basic and limiting deficiencies including appreciable losses or reduction of friction characteristics or braking effectiveness and diminished wear life when subjected to the rigors of high energy service conditions. For instance, the available common friction products soon expend their effectiveness and/or uniform braking friction properties and their resistance to wear when exposed to the high pressure and temperature conditions encountered in aircraft braking, rigorous high speed automotive driving or racing, and other applications involving exaggerated high energy braking service conditions.

It is a primary object of this invention to provide improved friction compositions or products thereof having stable coefficients of friction and good frictional characteristics over an extended range of temperature conditions including very high autogenous surface or interface temperatures of about 1500° F. to 2000° F. encountered in high energy braking service.

It is also a primary object of this invention to provide improved friction compositions and products thereof which possess good wearing properties, provide an enduring and long wear life under the most adverse and rigorous service of unit loading brake pressures as high as 1200 p.s.i. or greater and superficial temperatures of up to 2000° F. involved in high energy input braking.

It is a further and more specific object of this invention to provide improved friction compositions and/or brake elements for aircraft, automotive disc-type brakes and other high energy or excessive service which effectively and fully meet the requirements of high and uniform friction characteristics, high temperature resistance and which do not lose or expend their effectivness in these requirements at great pressures and throughout the generation or evolution of very high temperatures encountered during arduous and taxing braking, while providing an extended service life.

These and other objects and advantages will become more apparent from there hereinafter detailed description of this application.

In its broader aspects, the improved friction compositions of this invention for varying applications of immoderate or high energy service conditions comprise novel combinations of resin bonded components substantially uniformly mixed in relatively finely divided or particulate form wherein the required essential constituents of the combination include organic thermosetting resin binder, graphite, powdered brass and/or bronze or the like relatively soft copper alloy, calcium aluminate cement, and asbestos. The compositions of this invention are obtained by combining the ingredients thereof within the approximate essential ratios given in percentages by weight of the total composition:

| | Percent by weight |
|---|---|
| Thermosetting resin binder | 12–30 |
| Graphite | 1–5 |
| Brass or bronze powder | 12–40 |
| Calcium aluminate cement | 10–25 |
| Asbestos fiber | 10–40 |
| Barytes | 0–12 |
| Organic friction particle | 0–10 |
| Mica | 0–10 |
| Metal oxide | 0–15 |

For the more demanding high energy applications such as aircraft service wherein unit loading brake pressures and interface braking temperature conditions encountered exceed the tolerances of many of the more conventional friction composition materials or ingredients such as organic friction particles, etc., the compositions of this invention preferably comprise those consisting essentially of the following given combinations of ingredients in the approximate percentages set forth:

| | Percent by weight |
|---|---|
| Thermosetting resin | 20–30 |
| Graphite | 2–5 |
| Barytes | 2–8 |
| Brass or bronze powder | 20–40 |
| Calcium aluminate cement | 10–25 |
| Asbestos fiber | 10–40 |

Although typical thermosetting resins which are curable to an insoluble and infusible thermoset state are generally suitable as a binder component, including for example, phenol formaldehyde, phenol furfural, melamines, and aniline formaldehyde, the phenol formaldehyde resins are decidedly preferred for their normally greater resistance to elevated temperature conditions and more often than not are necessary for the more arduous service conditions exemplified by aircraft applications. The thermosetting resin binder component in all phases of this invention may be applied and cured in accordance with the known techniques or practices of the resin and friction material arts.

Without restricting the invention to any theory, mechanism or function of the respective components, but for purposes of illustration and explanation, it appears the component materials primarily function as follows. The graphite serves to extend the life of the brake element and to alleviate harshness or grabbing during engagement of the element without imparting a reduction in friction. Barytes primarily comprise a high density, strengthening filler effecting integrity and long wear life for the more demanding brake installations, but which may be replaced by other agents identified herein in less strenuous service. And, the basic function of the asbestos fiber is to improve the strength and integrity of molded friction elements.

The relatively soft powdered copper alloys comprising brass and/or bronze act both as wear particles and heat conductors conveying away thermal energy. The brass powder includes alloys ranging from a ratio of about 30% zinc and 70% copper through to a ratio of about 10% zinc and 90% copper, and the bronze powder comprises alloys of approximately 75% to 90% copper and 25% to 10% tin. Small amounts of other metals can be tolerated, as for example unspecified metals in amounts not substantially greater than about 5% by weight such as iron, lead, copper, tin, zinc, etc., or oxides thereof which are compatible with the balance of the system. And, as will be apparent hereinafter, further relatively insignificant amounts of the foregoing metals or oxides thereof, and/or other materials may also find their way into the combination as a part of the composition of the calcium aluminate cement.

The calcium aluminate cement, a fundamental and cardinal ingredient, is included as a friction particle, which in combination with the other basic components of the essential combination, imparts marked effects and advantages in both the friction and wear properties to the composition of this invention or elements composed thereof. The performance of calcium aluminate cement in this regard is decidedly superior to prior more or less heat resistant or refractory, hard fillers including silica, alumina, or both, ilmenite and the like heretofore conventional friction filler materials as will be demonstrated hereinafter. Calcium aluminate cements, as is known, comprise major proportions of combined calcium oxide and aluminum oxide along with minor proportions of iron oxide and silica and impurities, in a finely divided relatively homogeneous state. These cements contain compositions of roughly equivalent proportions of lime and alumina with each of said major components typically ranging about 36% to 42% by weight of the cement, iron oxide in amounts running up as high as 20%, and silica typically from about 4 to 7%. Exemplary compositions of suitable calcium aluminate cements are given in pages 431 through 437 of The Chemistry of Cement and Concrete, Lea and Desch, revised by Lea, St. Martin's Press, Inc., 1956.

Friction elements of apt configuration may be formed of the foregoing compositions by substantially uniformly blending the essential components within the given ratios and hot pressing the resulting mix to consolidate and cure the same. Consolidating pressures preferably range from about 2000 p.s.i. to about 6000 p.s.i. in conjunction with effective temperatures ranging from about 200° F. to 400° F., depending upon the optimum curing conditions of the particular resin employed as specified by the vendor or available in the literature. An initial or incipient cure is induced by the temperatures of the press and the cure is completed by subjecting the shaped elements to subsequent extended elevated temperatures as in an oven maintained at 300° F. to 500° F., over a suitable period, depending of course upon the nature of the thermosetting binder and its cure.

The following comprise specific illustrations of examples of preferred and typical compositions for different applications, and means or the method of this invention, and demonstrates the pronounced effects thereof. It is to be understood, however, that the specific techniques, compositions, materials and/or properties thereof are primarily exemplary and are not to be construed as limiting the invention to any particular data recited hereinafter.

EXAMPLE I

Powdered or finely divided ingredients in the following proportions:

*Composition formula*

| | Percent by weight |
|---|---|
| Phenol formaldehyde resin | 24.0 |
| Graphite | 2.5 |
| Fine barytes | 5.5 |
| Bronze powder [1] | 34.0 |
| Calcium aluminate cement [2] | 18.5 |
| Asbestos fiber | 15.5 |
| Total | 100.0 |

[1] Bronze mixture:
Copper _____ 87.5–90.5
Tin _____ 9.5–10.5

[2] Atlas Lumnite calcium aluminate cement—U.S. Steel Corp.
Analysis: Percent
$Al_2O_3 + TiO_2$ (normal $TiO_2 \pm 2.0\%$) ____ 42.6
CaO _____ 36.6
$FeO, Fe_4O_3$ _____ 10.8
$SiO_2$ _____ 8.8
MgO _____ 1.0
$SO_3$ _____ 0.2 were mixed for 10 minutes in a sigma blade mixer and mold charges of appropriate quantities thereof (computed on the basis of a finished product specific gravity of 2.48) were pressed in a single cavity, positive pressure mold at 4000 p.s.i. with a platen temperature of 300° F. The mold cure was for 30 minutes with a ½, 1, 3, and 5 minute period breathes. Elements thus formed were produced in two dimensions, pucks 2 inches in outside diameter by ½ inch thick and weighing about 65 grams, and 2 inches outside diameter by ⅜ inch thick weighing about 50 grams. The thus molded elements were then heat treated to complete the cure cycle by subjecting the same to a 6 hour temperature gradient up to 300° F. and then maintained at that temperature for 8 hours.

The relative effects of the friction composition comprising calcium aluminate cement in relation to like friction product compositions comprising silica, or perlite, or ilmenite, or both silica and alumina in lieu of calcium aluminate cement are demonstrated by the following comparative tests. Friction elements or buttons of the composition of the foregoing example comprising calcium aluminate cement and those of like compositions but with silica, or perlite, or ilmenite (titanic iron ore), or silica and alumina (in a ratio of 2:1) replacing the calcium aluminate cement, were tested by subjecting each to a comparative screening on a Bendix button testing device [1] under the following identical conditions—an initial contacting plate temperature of 1000° F., a velocity of 1275 feet per minute, a unit load on the friction sample of 225 pounds per square inch, and an engagement time of 15 seconds. The number of engagements was based on the amount of work done by the friction elements or buttons. An equivalence with the amount of work done during 20 dynamometer stops is considered a complete cycle. Relative wear rates of the like compositions containing the different specified agents were as follows:

| Composition Containing | Coefficient of Friction | Wear Rate in cu. in. Per HP hour Wear×10⁴ |
|---|---|---|
| Calcium aluminate cement | .45 | 112 |
| Silica | .45 | 295 |
| Perlite | .27 | 595 |
| Ilmenite | .28 | 167 |
| Silica and alumina | .41 | 750 |

Perlite, ilmenite, and the aluminum oxide and silica containing compositions all exhibited low friction properties and/or high wear rates and no further testing of these samples was therefore carried out. The silica containing composition, on the other hand, provided equivalent friction properties to that of the calcium aluminate-containing sample and these two types of friction compositions were thus further tested and compared on a dynamometer. When subjected to identical conditions, the relative wear rates of the calcium aluminate-containing sample and the silica-containing sample were as follows:

| Composition Containing | Coefficient of Friction | Wear in Grams Loss per Stop |
|---|---|---|
| Calcium aluminate cement | .25 | 1.72 |
| Silica | .28 | 2.25 |

[1] The Bendix button testing device comprises a free floating annular plate about 12 inches in diameter having gas or electrical heating means, and provided with a concentric perpendicular rotating shaft with arm mounting means for friction sample buttons. The free floating annular plate is provided with a strain-gauge to provide means for the determination of the friction properties of the sample. The shaft is rotated and the friction samples held on the arms of the shaft are brought into contact with the annular plate and rotated thereon under the specified conditions of heat, velocity, pressure, and time. Torque is measured by the strain gauge whereby the coefficient of friction can be calculated and the rate of wear is determined from the sample weight.

Friction product compositions embodying the novel concepts of this invention including the concerted action or mutual effects of the calcium aluminate cement friction particles within the medium of or combined with other basic ingredients, intended and thus formulated for less extreme braking or working conditions and in particular lower braking temperatures than in aircraft applications and yet high energy or inordinate service such as encountered in immoderate automotive driving and the disc type brakes designed therefor, comprise preferably the following components in the approximate proportions given in percent by weight:

| | Percent by weight |
|---|---|
| Thermosetting resin | 12–25 |
| Graphite | 1–5 |
| Brass or bronze powder | 12–35 |
| Calcium aluminate cement | 10–25 |
| Asbestos fiber | 10–40 |
| Organic friction particle | 5–15 |
| Mica | 4–10 |
| Barytes | 0–12 |
| Metal oxide | 0–15 |

The following comprise specific illustrations of preferred and/or typical compositions of this invention designed for applications less demanding than aircraft service, such as the inordinate high energy conditions encountered with automotive disc-type brakes and immoderate driving.

EXAMPLE II

Disc-type brake lining products for automotive service were produced from the following formulation and process:

| | Percent by weight |
|---|---|
| Phenol formaldehyde resin | 17 |
| Graphite | 3 |
| Hard rubber friction particle [1] | 8 |
| Mica, water ground | 6 |
| Barytes, fine | 9 |
| Bronze powder [2] | 20 |
| Calcium aluminate cement [3] | 15 |
| Asbestos fiber | 22 |
| | 100 |

[1] Common highly filled and highly cured reclaimed rubber friction particle.
[2] Bronze mixture:
  Copper _____ 87.5–90.5
  Tin _____ 9.5–10.3
[3] Atlas Lumite cement—U.S. Steel Corp. (same composition as identified in Example 1).

A stock of the given formulation was thoroughly mixed for 30 minutes to assure uniformity and 200 gram quantities pressed in a single cavity positive mold into units about ½ in. thick and 1⅝ in. in diameter and of an average specific gravity of about 2.55.

Molding was effected at 3000 p.s.i. and 280° F. platen temperature for 15 minute periods including spaced breaths of 1, 2 and 4 minute intervals. Curing was completed by a 10 hour increase to 350° F. followed by 5 hours at 350° F. whereupon the friction units or linings were machined to tolerances.

The organic friction particle employed in this phase of the invention, including the preferred hard reclaimed particles of Example II, comprise any conventional friction particle of hard or highly filled and highly cured natural, synthetic or reclaimed rubber, or thermosetting resin based material such as polymerized cashew nut shell oil, which will not pass through an inversion or softening during the curing and which cure to an insoluble and infusible thermoset state.

EXAMPLES III–VI

Further exemplary friction compositions of this invention designed for automotive service and generally comprising modifications of the formulation of Example II containing the same ingredients but with the inclusion of about 11 percent of the given metal oxide friction particles comprising zinc oxide, ferric oxide, chromium oxide and stannous oxide in lieu of the barytes, are illustrated in Examples III through VI.

| | Percent by wt. | Example | | | |
|---|---|---|---|---|---|
| | | III | IV | V | VI |
| Metal oxide | 11 | ZnO | $Fe_2O_3$ | $Cr_2O_3$ | SnO |
| Phenolic resin | 16 | | | | |
| Graphite | 2 | | | | |
| Rubber friction particle | 9 | | | | |
| Mica, water ground | 6 | | | | |
| Bronze powder | 17 | | | | |
| Calcium aluminate cement | 15 | | | | |
| Asbestos fiber | 24 | | | | |

The automotive disc-type friction compositions of Examples II through VI were evaluated by determining their frictional properties and rate of wear under varying working conditions given with the Bendix button testing device and procedure described above and compared with a prior product of similar composition but without the calcium aluminate cement particles as the standard. The composition of the standard consisted of: phenol formaldehyde resin 20%, carbon black 1%, graphite 3%, hard rubber friction particle [2] 10%, barytes 16%, bronze powder 8%, and asbestos fiber 42%.

The compositions of Examples II through VI and the standard being intended for automotive rather than the more demanding aircraft service, the conditions of these latter tests are less stringent than the aircraft test of Example I insofar as the initial contacting plate temperatures and pressures but are further designed to evaluate the products at engagement periods of 30 seconds under several different contact temperatures, until loads and velocities which accurately simulate automotive braking under a broad range of realistic and immoderate driving conditions. The conditions of the Bendix button test for each determination and the data derived with the Standard and each composition of Example II through VI are set forth in the following table giving the coefficient of friction as N and the wear rate in cubic inches per horsepower hour or wear$\times 10^4$.

[2] Same hard reclaimed rubber particle as Example II.

TABLE

| | | | | | | | | |
|---|---|---|---|---|---|---|---|---|
| Engagement time, sec | 30 | | 30 | | 30 | | 30 | |
| Average contacting plate temp. °F | 400 | | 450 | | 550 | | 550 | |
| Unit load, p.s.i. | 225 | | 500 | | 500 | | 1,000 | |
| Velocity, ft./min | 765 | | 1,275 | | 2,550 | | 2,550 | |
| | N | Wear | N | Wear | N | Wear | N | Wear |
| Standard | 0.28 | 0.0009 | 0.35 | 0.0015 | 0.24 | 0.0030 | 0.21 | 0.0031 |
| Example II | 0.32 | 0.0010 | 0.43 | 0.0010 | 0.39 | 0.0035 | 0.34 | 0.0040 |
| Example III | 0.38 | 0.0020 | 0.27 | 0.0020 | 0.43 | 0.0020 | 0.42 | 0.0025 |
| Example IV | 0.38 | 0.0010 | 0.33 | 0.0020 | 0.40 | 0.0055 | 0.37 | 0.0055 |
| Example V | 0.43 | 0.0010 | 0.37 | 0.0040 | 0.35 | 0.0110 | 0.32 | 0.0090 |
| Example VI | 0.38 | 0.0010 | 0.36 | 0.0010 | 0.30 | 0.0020 | 0.30 | 0.0025 |

The rate of wear, of course, being directly attributable to the amount of work performed by a particular composition, it is evident that, as is generally the case with the Standard under most given braking conditions, a low coefficient of friction or work performance will result in a commensurate low wear rate whereby these properties must be considered in relation to each other and evaluated by their relative showing over all conditions of braking likely to be encountered in actual service.

Considering the relative properties of the products of this invention over the scope of test and in turn simulated driving and braking conditions, they demonstrate significant improvements in both frictional effectiveness and endurance over the Standard.

Thus, the friction compositions of this invention consisting of the specified combination comprising calcium aluminate cement produces decidedly superior friction and/or wear properties in a variety of diverse and arduous services over comparable compositions employing similar refractory materials as fillers and as such provides improved friction or braking elements which stand up under and meet the requirements of high energy service as encountered in aircraft and other inordinate or heavy duty applications.

It will be understood that the foregoing details are given for purposes of illustration, not restriction, and that variations within the spirit of this invention are intended to be included within the scope of the appended claims.

What I claim is:

1. A friction composition characterized by its stability over extended pressure and temperature conditions for the manufacture of high energy service friction elements, said composition consisting essentially of the combination, in percent by weight of the total of: approximately 12 to 30% of thermosetting resin binder, approximately 1 to 5% of graphite, approximately 12 to 40% of powdered copper alloy selected from the group consisting of brass powder, bronze powder, and mixtures thereof, approximately 10 to 25% of calcium aluminate cement, approximately 10 to 40% of asbestos fibers, 0 to approximately 12% of barytes, 0 to approximately 10% of organic friction particles, 0 to approximately 10% of mica particles, and 0 to approximately 15% of at least one metal oxide selected from the group consisting of zinc oxide, ferric oxide, chromium oxide, and stannous oxide.

2. The composition of claim 1 wherein the thermosetting resin binder of the combination is phenol formaldehyde resin.

3. A friction composition characterized by its stability over extended pressure and temperature conditions for the manufacture of high energy service friction elements, said composition consisting essentially of the combination, in percent by weight of the total of: approximately 20 to 30% of thermosetting resin binder, approximately 1 to 5% of graphite, approximately 2 to 8% of barytes, approximately 12 to 40% of powdered copper alloy selected from the group consisting of brass powder, bronze powder, and mixtures thereof, approximately 10 to 25% of calcium aluminate cement, and approximately 10 to 40% of asbestos fibers.

4. The composition of claim 3 wherein the thermosetting resin binder of the combination is phenolic resin.

5. A friction composition characterized by its stability over extended pressure and temperature conditions for the manufacture of high energy service friction elements, said composition consisting essentially of the combination, in percent by weight of the total of: approximately 24% of thermosetting resin binder, approximately 2.5% of graphite, approximately 5.5% of barytes, approximately 34% of bronze powder, approximately 18.5% of calcium aluminate cement, and approximately 15.5% of asbestos fiber.

6. The composition of claim 5 wherein the thermosetting resin binder of the combination is phenolic resin.

7. A molded, high energy service friction element characterized by its stability over extended pressure and temperature conditions, said element consisting essentially of the thermosetting resin bonded combination, in percent by weight of the total of: approximately 20 to 30% of thermosetting resin, approximately 2 to 5% of graphite, approximately 2 to 8% of barytes, approximately 20 to 40% of powdered copper alloy selected from the group consisting of brass powder, bronze powder, and mixtures thereof, approximately 10 to 25% of calcium aluminate cement, and approximately 10 to 40% of asbestos fiber.

8. The composition of claim 7 wherein the thermosetting resin binder of the combination is phenolic resin.

9. A molded, high energy service friction element characterized by its stability over extended pressure and temperature conditions, said element consisting essentially of the thermosetting resin bonded combination, in percent by weight of the total of: approximately 24% of thermosetting phenolic resin, approximately 2.5% of graphite, approximately 5.5% of barytes, approximately 34% of bronze powder, approximately 18.5% of calcium aluminate cement, and approximately 15.5% of asbestos fiber.

10. A friction composition characterized by its stability over extended pressure and temperature conditions for the manufacture of high energy service friction elements, said composition consisting of the combination, in percent by weight of the total of: approximately 12 to 25% of thermosetting resin, approximately 1 to 5% of graphite, approximately 12 to 35% of powdered copper alloy selected from the group consisting of brass powder, bronze powder, and mixtures thereof, approximately 10 to 25% of calcium aluminate cement, approximately 10 to 40% of asbestos fiber, approximately 5 to 15% of organic friction particle, approximately 12% of barytes, and 0 to approximately 15% of at least one metal oxide selected from the group consisting of zinc oxide, ferric oxide, chomium oxide and stannous oxide.

11. The composition of claim 10 wherein the thermosetting resin binder of the composition is phenol formaldehyde resin and the organic friction particles comprise rubber.

12. A friction composition characterized by its stability over extended pressure and temperature conditions for the manufacture of high energy service friction elements, said composition consisting of the combination, in percent by weight of the total of: approximately 17% of phenol formaldehyde resin, approximately 3% of graphite, approximately 8% of hard rubber friction particles, approximately 6% of mica, approximately 9% of barytes, approximately 20% of bronze powder, approximately 15% of calcium aluminate cement, and approximately 22% of asbestos fiber.

13. A friction composition characterized by its stability over extended pressure and temperature conditions for the manufacture of high energy service friction elements, said composition consisting of the combination, in percent by weight of the total of: approximately 16% of phenolic resin, approximately 2% of graphite, approximately 9% of rubber friction particles, approximately 6% of mica, approximately 17% of bronze powder, approximately 15% of calcium aluminate cement, approximately 24% of asbestos fiber and approximately 11% of at least one metal oxide selected from the group consisting of zinc oxide, ferric oxide, chromium oxide, and stannous oxide.

References Cited by the Examiner

UNITED STATES PATENTS

| | | | |
|---|---|---|---|
| 2,273,770 | 2/1942 | Nanfeldt | 18—47.5 |
| 2,885,379 | 5/1959 | Taylor et al. | 260—38 |

MORRIS LIEBMAN, *Primary Examiner.*

A. HOLTZ, H. S. KAPLAN, *Assistant Examiners.*

UNITED STATES PATENT OFFICE
CERTIFICATE OF CORRECTION

Patent No. 3,297,599            January 10, 1967

Franklin W. Eschen

It is hereby certified that error appears in the above numbered patent requiring correction and that the said Letters Patent should read as corrected below.

Column 1, line 59, for "there" read -- the --; column 4, in the first table, the headings to the second and third columns should appear as shown below instead of as in the patent:

| Coefficient of Friction | Wear Rate in cu. in. Per HP hour Wear×$10^4$ |
|---|---|

Signed and sealed this 17th day of October 1967.

(SEAL)
Attest:

EDWARD M. FLETCHER, JR.           EDWARD J. BRENNER
Attesting Officer               Commissioner of Patents